United States Patent Office 3,235,601

Patented Feb. 15, 1966

1

3,235,601

PROCESS FOR THE PRODUCTION OF CIVETONE AND HOMOLOGUES

Charles G. Parsons, Mentor, Ohio, and William H. Pittman, Takoma Park, Md., assignors to Diamond Alkali Company, Cleveland, Ohio, a corporation of Delaware No Drawing. Filed Nov. 5, 1962, Ser. No. 235,511

7 Claims. (Cl. 260—586)

This invention relates to new compositions of matter and to methods for their preparation. More particularly, it relates to novel trans olefinic compounds represented by the structure:

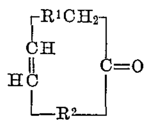

wherein $R^1$ and $R^2$ are divalent hydrocarbon redicals containing straight chains of from 4 to 10 carbon atoms; and to a novel method for the synthesis of these compounds and of other macrocyclic ketones for use in the perfume industry.

Civetone, a constituent of an oil secreted by the civet cat, is a valuable perfume base. The determination of the gross structure of civetone was accomplished by Ruzicka and coworkers [Helv. Chim. Acta, 9, 230 (1926); ibid., 10, 695 (1927)], who identified it as 9-cycloheptadecene-1-one. In 1948, Stoll and coworkers [Helv. Chim. Acta, 31, 543 (1948)] proved, by an elegant sequence of reactions, that naturally occurring civetone has the cis configuration.

The high demand and short supply of civetone and of muscone (3-methylcyclopentadecanone), a secretion of the musk deer which is also a valuable perfume base, have encouraged attempts to prepare synthetic products which may be substituted for natural civetone and muscone. Thus, Blomquist and coworkers [J. Am. Chem. Soc., 77, 1804 (1955)] synthesized cyclic monoketones which possessed strong musk odors.

The synthesis of civetone, both the cis and trans forms, and homologs thereof, has also been the subject of much investigation. In U.S. Patent 1,720,748, there is described a process for preparing civetone by oxidation of civetol, another constituent of civet oil. In effect, this increases the yield of natural civetone, but it does not dispense with the necessity of reverting to natural sources.

Preparation of civetone by pyrolysis of the thorium salt of 9-octadecene-1,18-dioic acid (Swiss Patent 136,543) or the yttrium salt of the same acid (U.S. Patent 1,873,-154) has been successfully attempted. The expense of this method is prohibitive, since thorium and yttrium salts are not readily available and yields are rather low.

Hunsdiecker [Ber., 76B, 142 (1943); ibid., 77B, 185 (1944)] has prepared civetone by a rather long series of reactions from aleuritic acid (1,10,16-trihydroxyhexadecanoic acid), a constituent of shellac. However, the number of reactions required and the necessity for isolation of the starting material from natural sources make this process commercially unattractive.

Blomquist et al. (U.S. Patent 2,790,005) have prepared civetone analogs by partial reduction of macrocyclic diketones, followed by dehydartion. This process, however, apparently gives a mixture of cis and trans isomers (judging from the reported melting point of the product), rather than pure cis or trans material.

2

A primary object of the present invention, therefore, is to prepare stereochemically pure cis and trans homologs of civetone.

A further object is to prepare civetone homologs by a relatively simple reaction sequence from readily available starting materials.

These and other objects will become apparent to those skilled in the art upon reading the description of the invention which follows.

According to the present invention, civetone homologs of the structure:

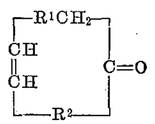

wherein $R^1$ and $R^2$ are divalent hydrocarbon radicals containing straight chains of from 4 to 10 carbon atoms, are prepared by a method which comprises the steps of:

(a) Partially reducing a cyclic diacetylene of the structure

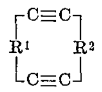

thereby producing an enyne of the structure

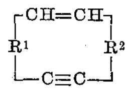

and (b) Hydrating said enyne in the presence of a mercury-containing catalyst.

The cyclic diacetylenes used as starting materials in the preparation of compounds of this invention may be prepared from disodium acetylide and an alpha, omega-dihalide.

The method to be employed for the reduction of the cyclic diacetylene to the corresponding enyne will depend on whether a cis or trans product is desired. In the preferred embodiment of this invention, the reduction is carried out by means of sodium in liquid ammonia, and the products are the novel trans olefinic ketones described hereinabove.

In the reduction of cyclic diacetylenes by sodium in liquid ammonia, a molar ratio of sodium to diacetylene of between about 3:1 and 5:1 is used. Owing to the fact that the reaction does not go to completion, this amount of sodium is satisfactory for selective reduction of one triple bond. (The theoretical ratio is 2:1.) The preferred means of addition is to add the sodium in small quantities to the diacetylene in liquid ammonia, thus avoiding a large excess of sodium which would promote indiscriminate reduction of both triple bonds.

If desired, a small amount of a low-melting, inert solvent may be added to the reaction mixture to maintain the cyclic diacetylene and reduction products thereof in solution.

After the sodium has been added to the stirred liquid ammonia solution, the ammonia is gradually allowed to evaporate and the excess sodium is decomposed by the cautious addition of water or alcohol. The crude product may then be freed of inorganic impurities and immediately subjected to hydration, without prior purification.

For the synthesis of products having a double bond with the cis configuration according to the method of this invention, catalytic hydrogenation is the preferred method of reduction. Any one of a number of catalysts may be used; for example, platinum, palladium, nickel, copper chromite and the like. However, these catalysts have the disadvantage that they reduce a triple bond all the way to a single bond by introducing two moles of hydrogen. Therefore, the problem of control of the degree of hydrogenation and separation of product mixtures becomes almost insurmountable.

A preferred catalyst for the reduction of a triple bond to a double bond is Lindlar's catalyst. This material is prepared by reacting an aqueous solution of palladium chloride with hydrogen in the presence of calcium carbonate, thereby producing a slurry of finely divided palladium coated on calcium carbonate; and treating this material with a lead acetate solution, thus "poisoning" the catalyst to the extent that it will not reduce double bonds to single bonds but is effective for reducing triple bonds to cis double bonds.

The catalytic reduction is normally carried out by dissolving the cyclic diacetylene in a solvent such as methanol, ethanol, ethyl acetate, acetic acid or the like, adding a small amount (500 mg. or less is usually sufficient) of Lindlar's catalyst, and subjecting the resulting mixture to an initial pressure of about 50–100 p.s.i. of hydrogen in a Parr rocking bomb apparatus or the like. The reaction ordinarily proceeds satisfactorily at temperatures within the range of about 10–100° C., preferably about 20–80° C. The hydrogen pressure drops as the reaction proceeds, and the reaction may be followed by means of this drop in pressure. It is important to stop the reaction when half of the theoretical amount of hydrogen has been taken up, as the second triple bond will be hydrogenated if the reaction is allowed to proceed.

In the course of the reduction, whether by chemical or catalytic means, varying amounts of diene will be produced in addition to the desired enyne, and the product will therefore be a mixture of diene, enyne, and unreacted diacetylene. However, it is usually neither necessary nor desirable to separate the components at this stage, since separation is difficult, and can be much more easily carried out after hydration.

Any of several methods may be used for hydration of the product from the reduction. In general, a mercury-containing catalyst is required for hydration of a triple bond. One method which may be used is to heat an aqueous solution containing a small amount of a soluble mercury salt, e.g., mercuric sulfate, together with a mineral acid, the product mixture as described hereinabove, and enough of a water-miscible organic solvent (e.g., methanol, tetrahydrofuran) to keep most of the organic material in solution. However, under these conditions it is possible that the double bond will also be hydrated, necessitating a subsequent dehydration to produce the desired enone.

A more satisfactory method of hydration is that described by Hamlet et al. [J. Chem. Soc., 2652 (1951)]. By this method, the acetylenic reactant is dissolved in a low molecular weight alcohol, e.g., methanol, and treated with a mixture of mercuric oxide, boron trifluoride etherate and trichloroacetic acid. The reaction ordinarily proceeds rapidly and exothermically without additional heating. The product is the dimethyl ketal of the desired civetone homolog which may then be hydrolyzed to afford the desired product.

Following hydration as described hereinabove, the enone (civetone homolog) may be separated from the diene and diketones also present in the crude product by any suitable means, e.g., absorption chromatography.

The novel compounds of this invention have a wide variety of uses. As analogs of civetone they may be useful as perfume bases. They also have application as chemical intermediates; thus, they undergo the normal reactions of olefins and carbonyl compounds and may serve as precursors to a large number of interesting and useful materials. For example, catalytic hydrogenation of the double bond may be accomplished by well known methods; the products are saturated cyclic monoketones which are also useful as perfume bases [Blomquist et al., J. Am. Chem. Soc. 77, 1804 (1955)].

The compounds of this invention are also effective as pesticides for controlling fungi, bacteria, smuts, mildew, nematodes and other organisms in the class of plant pests.

While it is possible to apply the compounds of the present invention in undiluted form to the plant or other material to be protected, it is frequently desirable to apply the novel compounds in admixture with either solid or liquid inert, pesticidal adjuvants. Thus, the compounds can be applied to the plants for fungicidal purposes, for example, by spraying them with aqueous or organic solvent dispersions of the compound. Similarly, wood surfaces can be protected by applying a protective film of the compound by brushing, spraying or dipping utilizing a liquid dispersion of the compound. The choice of an appropriate solvent is determined largely by the concentration of active ingredient which it is desired to employ, by the volatility required in a solvent, the cost of the solvent and the nature of the material being treated. Among the many suitable organic solvents which can be employed as carriers for the present pesticides, there may be mentioned hydrocarbons such as benzene, toluene, xylene, kerosene, diesel oil, fuel oil, petroleum, naphtha, ketones such as acetone, methyl ethyl ketone and cyclohexanone, chlorinated hydrocarbons, such as carbon tetrachloride, chloroform, trichloroethylene, perchlorethylene, esters such as ethyl acetate, amyl acetate and butyl acetate, the monoalkyl ethers of ethylene glycol, e.g., the monomethyl ethers and the monoalkyl ethers of diethylene glycol, e.g., the monoethyl ether, alcohols such as ethanol, isopropanol and amyl alcohol, etc.

The compounds can also be applied to plants and other materials along with inert solid fungicidal adjuvants or carriers such as talc, pyrophyllite, Attaclay, kieselguhr, chalk, diatomaceous earth, lime, calcium carbonate, bentonite, fuller's earth, cottonseed hulls, wheat flour, soybean flour, etc., pumice, tripoli, wood flour, walnut shell flour and lignin.

It is frequently desirable to incorporate a surface active agent in the pesticidal compositions of this invention. Such surface active agents are advantageously employed in both the solid and liquid compositions. The surface active agent can be anionic, cationic or nonionic in character.

Typical classes of surface active agents include alkyl sulfonates, alkylaryl sulfonates, alkyl sulfates, alkylamide sulfonates, alkylaryl polyether alcohols, fatty acid esters of poyhydric alcohols, ethylene oxide addition products of such esters; addition products of long chain mercaptans and ethylene oxide; sodium alkyl benzene sulfonates having 14 to 18 carbon atoms, alkyl-phenolethylene oxides, e.g., p-isooctyl phenol condensed with 10 ethylene oxide units, and soaps, e.g., sodium stearate and sodium oleate.

The solid and liquid formulations can be prepared in any suitable method. Thus, the active ingredients, in finely divided form if a solid, may be tumbled together with finely divided solid carrier. Alternatively, the active ingredient in liquid form, including solutions, dispersions, emulsions and suspensions thereof, may be admixed with the solid carrier in finely divided form in amounts small enough to preserve the free-flowing property of the final dust composition.

When solid compositions are employed, in order to obtain a high degree of coverage with a minimum dosage of the formulation, it is desirable that the formulation be in finely divided form. The dust containing active ingredient usually should be sufficiently fine that substantially all will pass through a 20-mesh Tyler sieve. A dust which passes through a 200-mesh Tyler sieve also is satisfactory.

For dusting purposes, preferably formulations are employed in which the active ingredient is present in an amount of 5% to 50% of the total by weight. However, concentrations outside this range are operative and compositions containing from 1 to 99% of active ingredient by weight are contemplated, the remainder being carrier and/or any other additive or adjuvant material which may be desired. It is often advantageous to add small percentages of surface active agents, e.g., 0.5% to 1% of the total composition by weight, to dust formulations, such as the surface active agents previously set forth.

For spray application, the active ingredient may be dissolved or dispersed in a liquid carrier, such as water or other suitable liquid. The active ingredient can be in the form of a solution, suspension, dispersion or emulsion in aqueous or non-aqueous medium. Desirably, 0.5% to 1.0% of a surface active agent by weight is included in the liquid composition.

For adjuvant purposes, any desired quantity of surface active agent may be employed, such as up to 250% of the active ingredient by weight. If the surface active agent is used only to impart wetting qualities, for example, to the spray solution, as little as 0.05% by weight or less of the spray solution need be employed. The use of larger amounts of surface active agent is not based upon wetting properties but is a function of the physiological behavior of the surface active agent. These considerations are particularly applicable in the case of the treatment of plants. In liquid formulations the active ingredient often constitutes not over 30% by weight of the total and may be 10%, or even as low as 0.01%.

The novel compounds of the present invention can be employed in compositions containing other pesticides, more especially fungicides, insecticides and bactericides, e.g., phenothiazine, pyrethrum, rotenone, DDT, etc.

The following examples are given in order that those skilled in the art may more completely understand the invention and the preferred means by which the same may be carried into effect.

EXAMPLE 1

*Preparation of 1,8-cyclotetradecadiyne*

Two and one-half liters of liquid ammonia is placed in a flask, followed by the addition of 1.35 g. of ferric nitrate hydrate (0.3 g. for each g. atom of sodium employed). Two grams of sodium metal is then added and activated by bubbling dry air into the mixture. Sodium metal, 103.5 g. (4.4 moles), is added in small portions and 54.3 liters (2.22 moles) of acetylene gas at 28° C. and 747 mm. mercury pressure is bubbled into the suspension of the sodium amide. 1.5-dibromopentane, 500 g. (2.2 moles) is added at a fast dropwise rate sufficient to retain gentle refluxing of the ammonia. Upon completion of addition of the dibromopentane, agitation of the mixture is increased to wash down the splattered material on the sides of the reaction flask. The reaction is then stopped and the openings of the reaction vessel covered with polyvinyl chloride film, the reaction mixture being allowed to stand overnight. The reaction mixture is then agitated while water is added slowly with caution. The pressure is vented by loosening the plastic sheets covering the reaction vessel opening. Upon addition of about 400 ml. of water, the reaction vessel walls are washed by increasing the agitation. The resultant gummy solid is found to be a soluble in organic solvents, i.e., pentane and ether. Isolation of the desired acetylenic cyclic hydrocarbon is accomplished by recrystallization from ether, yielding not only the cyclic hydrocarbon but also the respective linear triyne and tetrayne as by-products. The crude product is further vacuum distilled and recrystallized from ether, yielding the desired product, melting at 99° to 100° C. The isolation of the desired 1,8-cyclotetradecadiyne, $C_{14}H_{20}$, having a molecular weight of 188.3, is indicated by the following elemental analytical data:

| Element | Actual percent by weight | Calculated percent by weight |
|---|---|---|
| Carbon | 89.6 | 89.3 |
| Hydrogen | 10.6 | 10.7 |

Infrared spectra indicate the presence of internal acetylenic linkage and the absence of terminal acetylenic linkage.

EXAMPLE 2

*Preparation of trans-7-cyclotetradecene-1-one*

PART A.—REDUCTION OF 1,8-CYCLOTETRADECADIYNE

To a stirred suspension of 138.7 g. (0.74 mole) of 1,8-cyclotetradecadiyne in 1500 ml. of liquid ammonia is added 51 g. (2.22 gram-atoms) of freshly cut sodium metal and 50 ml. of anhydrous ether. The mixture is stirred for several hours, after which the openings in the reaction flask are sealed with plastic film ("cellophane") to retard the evaporation of ammonia and the flask is allowed to stand overnight.

When nearly all of the ammonia has evaporated, about 200 ml. of water is cautiously added dropwise with stirring. The solid product is removed by filtration and freed of inorganic impurities by dissolving in a mixture of acetone and ether, filtering and evaporating the solvent. There is obtained 109.9 g. of solid product which is analyzed by vapor phase chromatography and by comparison with known compounds, found to have the following composition:

| | Percent |
|---|---|
| Trans,trans-1,8-cyclotetradecadiene | 13.9 |
| 1,8-cyclotetradecadiyne | 72.7 |
| Trans-1-cyclotetradecene-8-yne | 13.4 |

PART B.—HYDRATION

The material hydrated is a mixture of reduction products, prepared as in Part A and having the following composition:

| | Percent |
|---|---|
| Trans,trans-1,8-cyclotetradecadiene | 23.2 |
| 1,8-cyclotetradecadiyne | 52.5 |
| Trans-1-cyclotetradecene-8-yne | 24.3 |

To a solution of 94.7 g. of this mixture in 400 ml. of methanol is added, with stirring, a warm solution of 6 g. of red mercuric oxide, 4 ml. of boron trifluoride etherate, and 10 g. of trichloroacetic acid in 175 ml. of methanol. The temperature rises to 62° C. as the catalyst solution is added. The solution is heated under reflux for two hours.

The solvent is removed by vacuum evaporation and the residue is treated with about 200 ml. of 5% aqueous sodium bicarbonate, followed by an equal volume of 1:1 hydrochloric acid. It is then dissolved in a boiling mixture of acetone and ether, filtered and cooled. The precipitated solids weigh 104.4 g. Of this crude product, 90 g. is subjected to absorption chromatography on a column 2 feet long by 25 mm. I.D., packed with 200 g. of alumina. Upon elution of n-pentane, benzene, ether and methanol, the components of the mixture are recovered in the following order: trans,trans-1,8-cyclotetradecadiene; trans - 7 - cyclotetradecene - 1 - one; 1,7 - cyclotetradecanedione; 1,8-cyclotetradecanedione. Separation of diene from enone if not complete.

The mixture of diene and enone is again chromatographed on a column 4 feet long by 18 mm. I.D., packed with 250 g. of alumina. Upon eluation with n-pentane, there is first obtained 18.7 g. of trans,trans-1,8-cyclotetradecadiene, and then 18.3 g. (76.2% of the theoretical amount, based on the percentage of enyne in the reduction product) of trans-7-cyclotetradecene-1-one, $C_{14}H_{24}O$, M.P. 23° C. The structure is confirmed by comparison of its infrared spectrum with those of known compounds, and by the following analytical results.

| | Actual percent by weight | Calculated percent by weight |
|---|---|---|
| Carbon | 80.5 | 80.7 |
| Hydrogen | 11.7 | 11.6 |
| Molecular weight | 206 | 208 |

The purity of the civetone homolog, as determined by vapor phase chromatographic analysis, is 98%.

EXAMPLE 3

*Part A.—Preparation of 1,9-decadiyne*

A 5-liter, three-necked flask, equipped with a Dry Ice condenser and a stirrer, is charged with 3.5 liters of liquid ammonia and 296.2 g. (7.2 moles) of sodamide. Acetylene 11.0 cu. ft. (12.1 moles), is passed slowly into the stirred suspension. Stirring is continued for one-half hour after the acetylene addition is complete, and then 890 g. (3.6 moles) of 1,6-dibromohexane is added dropwise. The ammonia is allowed to evaporate overnight and the reaction mixture is hydrolyzed by cautious addition of about two liters of water. The aqueous suspension is acidified with hydrochloric acid and extracted with ether. The ether extracts are dried and the ether is removed by distillation. Upon distillation of the residue under reduced pressure, there is obtained 444.2 g. (91% of the theoretical amount) of 1,9-decadiyne, B.P. 80–84° C. at a pressure of 22 mm. of mercury.

*Part B.—Preparation of 1,9-cyclohexadecadiyne*

To a stirred suspension of 242 g. (6.2 moles) of sodamide in 10 liters of liquid ammonia, contained in a 12-liter, three-necked flask fitted wtih a stirrer and Dry Ice condenser, is added dropwise 415 g. (3.1 moles) of 1,9-decadiyne. The mixture is stirred for one hour and then 757 g. (3.1 moles) of 1,6-dibromohexane is added slowly. The ammonia is allowed to evaporate overnight and the residue is worked up as in Part A. After evaporation of the ether, there remains 650 g. of crude product. This product is taken up in petroleum ether and filtered. The solid residue, 214 g., is shown by examination of the infrared spectrum to be primarily linear polyacetylenic material, partially bromine-terminated.

The petroleum ether solution is concentrated and distilled under reduced pressure. The distillate, weighing 127.9 g. (the remainder being undistillable), is redistilled and 34.4 g. of 1,9-cyclohexadecadiyne, $C_{16}H_{24}$, is obtained, B.P. 116° C. at a pressure of 0.7 mm. of mercury. The structure is confirmed by infrared analysis and by the following elemental analytical results.

| | Actual percent by weight | Calculated percent by weight |
|---|---|---|
| Carbon | 88.1 | 88.9 |
| Hydrogen | 11.0 | 11.1 |
| Molecular weight | 205 | 216 |

The material is shown by vapor phase chromatographic analysis to be 97.5% pure.

EXAMPLE 4

*Preparation of trans-8-cyclohexadecene-1-one*

PART A.—REDUCTION OF 1,9-CYCLOHEXADECADIYNE

A solution of 30 g. (0.13 mole) of 1,9-cyclohexadecadiyne in 25 ml. of anhydrous ether is added to 500 ml. of liquid ammonia. Freshly cut sodium, 9 g. (0.39 gram-atom), is added gradually with stirring. After the addition of the sodium, the mixture is stirred for one hour, and the bulk of the ammonia then allowed to evaporate. The residue is decomposed by the cautious addition of 200 ml. of water.

The aqueous mixture is extracted with ether and the extracts are dried over calcium chloride. Upon evaporation of the ether, there is obtained 30.4 g. of an oil which is shown by vapor phase chromatography, upon comparison with known compounds, to have the following composition:

| | Percent |
|---|---|
| 1,9-cyclohexadecadiyne | 58.6 |
| Trans,trans-1,9-cyclohexadecadiene | 4.8 |
| Trans-1-cyclohexadecene-9-yne | 32.2 |
| 1,9-decadiene (impurity in reactant) | 4.4 |

PART B.—HYDRATION

Twenty-four grams of the reduction mixture of Part A is dissolved in 250 ml. of anhydrous methanol, and a solution of 3 g. of red mercuric oxide, 2 ml. of boron trifluoride etherate, and 2 g. of trichloroacetic acid in 30 ml. of methanol is added with stirring. The mixture is heated under reflux for one-half hour and is then cooled to room temperature. A white solid separates and is removed by filtration; it is identified as 1,1,9,9-tetramethoxycyclohexadecane by infrared and elemental analysis.

The filtrate is evaporated in vacuo and hydrolyzed with 100 ml. of 11:1 hydrochloric acid. The acidified mixture is extracted with ether and the extracts are dried over anhydrous calcium sulfate. The ether is removed by evaporation and the residue is separated by chromatography, as in Example 2. There is obtained 4.9 g. (55.5% of the theoretical amount, based on the amount of enyne in the reduction product) of trans-8-cyclohexadecene-1-one, $C_{16}H_{28}O$, M.P. 17° C. The assigned structure is confirmed by comparison of the infrared spectrum with those of known compounds, and by the following analytical data.

| | Actual percent by weight | Calculated percent by weight |
|---|---|---|
| Carbon | 81.2 | 81.3 |
| Hydrogen | 11.6 | 11.8 |
| Molecular weight | 244 | 236 |

EXAMPLE 5

*Bactericidal activity*

Trans-7-cyclotetradecene-1-one is examined for ability to inhibit the growth of three bacterial species (*Erwinia amylovora, Micrococcus pyrogenes* var. *aureus,* and *Escherechia coli*) at a concentration of 250 p.p.m. The first and third above-named test species are Gram negative rods, the second species is Gram positive. They are all cultured on nutrient agar slants. The cultures used for tests are sub-cultured for two sequential 24-hour periods to insure uniform test populations. Bacterial suspensions are made from the second sub-culture in the culture tube by addition of distilled water and gentle agitation, after which they are filtered through double layers of cheesecloth and adjusted to standard concentrations by turbidimetric measurement.

Each of three test tubes arranged in a rack receive one ml. of the test formulation prepared by mixing 0.1 g. of trans-7-cyclotetradecene-1-one, 4 ml. of acetone, and 2 ml. of a stock solution of 0.5 percent Triton X–155 emulsifier in water and diluting to 80 ml. with water.

After the test formulations have been measured into a test tube, 3½ ml. of distilled water and ½ ml. of bacterial suspension for each respective test organism are added to each test tube. The final concentration of the test chemical is 250 p.p.m. The medication tubes are then set aside at room temperature for four hours. After this exposure period transfers are made by means of a standard four mm. platinum loop to 7 ml. of sterile broth in test tubes arranged in racks similar to those for the medication tubes. The broth tubes are then incubated for 48 hours at 29° to 31° C. at which time growth is measured by use of a Bauch & Lomb spectronic "20" direct reading colorimeter. A reading is recorded for each test tube after shaking. Usually three replicates of each organism serve as controls. Calculations are made on percent of the mean check readings. This figure subtracted from 100 gives percent control as compared to checks.

When tested by this method, trans-7-cyclotetradecene-1-one gives 100% control of *E. amylovora,* 91% control of *M. aureus,* and 33% control of *E. coli.*

It is to be understood that although the invention has been described with specific reference to particular embodiments thereof, it is not to be so limited, since changes and alterations therein may be made which are within the full intended scope of this invention as defined by the appended claims.

What is claimed is:

1. A method for the preparation of civetone homologs of the structure:

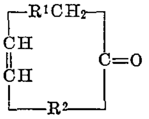

wherein $R^1$ and $R^2$ are divalent hydrocarbon radicals containing straight chains of from 4 to 10 carbon atoms, said method comprising the steps of:

(a) Partially reducing a cyclic diacetylene of the structure:

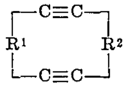

by reacting said diacetylene with a reagent selected from the group consisting of (1) sodium in liquid ammonia, the molar ratio of sodium to diacetylene being between about 3:1 and 5:1, and (2) hydrogen in the presence of Lindlar's catalyst, the amount of hydrogen absorbed being half the stoichiometric amount required for reduction of both triple bonds to double bonds, thereby producing an enyne of the structure:

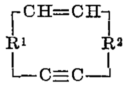

(b) Reacting said enyne with a low molecular weight alcohol in the presence of a catalyst mixture comprising mercuric oxide, boron trifluoride etherate and trichloroacetic acid, thereby forming a ketal of said civetone homolog, and (c) Hydrolyzing said ketal.

2. A method for the preparation of trans homologs of civetone of the structure:

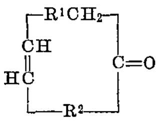

wherein $R^1$ and $R^2$ are divalent hydrocarbon radicals containing straight chains of from 4 to 10 carbon atoms, said method comprising the steps of:

(a) Partially reducing a cyclic diacetylene of the structure:

by reacting said cyclic diacetylene with sodium in liquid ammonia, the molar ratio of sodium to diacetylene being between about 3:1 and 5:1, thereby producing a trans-enyne of the structure:

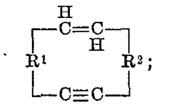

(b) Reacting said enyne with a low molecular weight alcohol in the presence of a catalyst mixture comprising mercuric oxide, boron trifluoride etherate and trichloroacetic acid, thereby forming a ketal of said civetone homolog, and (c) Hydrolyzing said ketal.

3. A method for the preparation of trans-7-cyclotetradecene-1-one, said method comprising the steps of:

(a) Reducing 1,8-cyclotetradecadiyne to trans-8-cyclotetradecene-1-yne by means of sodium in liquid ammonia, the molar ratio of sodium to diyne being between about 3:1 and 5:1, (b) Reacting said trans-8-cyclotetradecene-1-yne with a low molecular weight alcohol in the presence of a catalyst mixture comprising mercuric oxide, boron trifluoride etherate and trichloroacetic acid, thereby forming a ketal of trans-7-cyclotetradecene-1-one; and (c) Hydrolyzing said ketal.

4. The method according to claim 3 wherein the alcohol used in step (b) is methanol.

5. A method for the preparation of trans-8-cyclohexadecene-1-one, said method comprising the steps of:

(a) Reducing 1,9-cyclohexadecadiyne to trans-8-cyclohexadecene-1-yne by means of sodium in liquid ammonia, the molar ratio of sodium to diyne being between about 3:1 and 5:1, (b) Reacting said trans-8-cyclohexadecene-1-yne with a low molecular weight alcohol in the presence of a catalyst mixture comprising mercuric oxide, boron trifluoride etherate and trichloroacetic acid, thereby forming a ketal of trans-8-cyclohexadecene-1-one; and (c) Hydrolyzing said ketal.

6. The method according to claim 5 wherein the alcohol used in step (b) is methanol.

7. A method for the preparation of cis homologs of civetone of the structure:

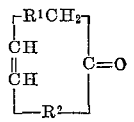

wherein $R^1$ and $R^2$ are divalent hydrocarbon radicals containing straight chains of from 4 to 10 carbon atoms, said method comprising the steps of:

(a) Partially reducing a cyclic diacetylene of the structure:

by reacting said cyclic diacetylene with hydrogen in the presence of Lindlar's catalyst, the amount of hydrogen absorbed being half the stoichiometric amount required for reduction of both triple bonds to double bonds, thereby producing a cis-enyne of the structure:

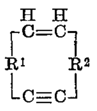

(b) Reacting said enyne with a low molecular weight alcohol in the presence of a catalyst mixture comprising mercuric oxide, boron trifluoride etherate and trichloroacetic acid, thereby forming a ketal of said civetone homolog, and (c) Hydrolyzing said ketal.

References Cited by the Examiner

FOREIGN PATENTS 339,348 12/1930 Great Britain.

OTHER REFERENCES

Migrdichian Organic Synthesis, Vol. II, pp. 984–6 and 997–9 (1957).

West et al. "Synthetic Perfumes," pp. 331–332 (1949).

LEON ZITVER, *Primary Examiner.*

LORRAINE A. WEINBERGER, *Examiner.*